United States Patent
Fukushi et al.

(10) Patent No.: US 11,953,513 B2
(45) Date of Patent: Apr. 9, 2024

(54) AUTOMATED ANALYZER

(71) Applicant: Hitachi High-Tech Corporation, Tokyo (JP)

(72) Inventors: Yudai Fukushi, Tokyo (JP); Takamichi Mori, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 584 days.

(21) Appl. No.: 17/274,993

(22) PCT Filed: Sep. 20, 2019

(86) PCT No.: PCT/JP2019/037098
§ 371 (c)(1),
(2) Date: Mar. 10, 2021

(87) PCT Pub. No.: WO2020/071163
PCT Pub. Date: Apr. 9, 2020

(65) Prior Publication Data
US 2022/0057422 A1 Feb. 24, 2022

(30) Foreign Application Priority Data
Oct. 2, 2018 (JP) .................................. 2018-187779

(51) Int. Cl.
*G01N 35/10* (2006.01)
*B01L 3/00* (2006.01)
(Continued)

(52) U.S. Cl.
CPC ........ *G01N 35/1004* (2013.01); *B01L 3/0282* (2013.01); *B01L 3/502* (2013.01);
(Continued)

(58) Field of Classification Search
CPC ........ B01L 13/02; B01L 3/0282; B01L 3/502; B01L 2200/025; B01L 2200/10;
(Continued)

(56) References Cited

U.S. PATENT DOCUMENTS 5,827,744 A * 10/1998 Fose .................... B08B 3/04
134/22.12
7,186,378 B2 3/2007 Dunfee
(Continued)

FOREIGN PATENT DOCUMENTS

CN 107533079 A 1/2018
EP 3 287 793 A1 2/2018
(Continued)

OTHER PUBLICATIONS

Masanori JP 4,443,271 English translation (Year: 2010).*
(Continued)

*Primary Examiner* — Christine T Mui
*Assistant Examiner* — Jonathan Bortoli
(74) *Attorney, Agent, or Firm* — Crowell & Moring LLP

(57) ABSTRACT

An automated analyzer is provided that includes a sample probe for dispensing a substance to be dispensed into a plurality of reaction vessels for causing a sample to be analyzed to react with a reagent, a measurement unit (e.g., light source, spectrophotometer, and control device) for measuring a reaction liquid produced from the sample and reagent in a reaction vessel, a cleaning tank for probe cleaning, and a control device for controlling the operation of the probe, measurement unit, and cleaning tank. The cleaning tank includes a cleaning pool for storing cleaning water for immersing and cleaning the probe and a drying tank for sucking up the cleaning water on the surface of the probe after the probe has been immersed in the cleaning water of the cleaning water pool and cleaned. As a result, it
(Continued)

is possible to reduce the amount of cleaning water used to clean the probe.

8 Claims, 7 Drawing Sheets

(51) Int. Cl.
    *B01L 3/02*     (2006.01)
    *G01N 21/77*     (2006.01)

(52) U.S. Cl.
    CPC ......... *B01L 13/02* (2019.08); *B01L 2200/025* (2013.01); *B01L 2200/10* (2013.01); *B01L 2200/141* (2013.01); *B01L 2200/16* (2013.01); *B01L 2300/0663* (2013.01); *B01L 2400/049* (2013.01); *G01N 21/77* (2013.01)

(58) Field of Classification Search
    CPC ........... B01L 2200/141; B01L 2200/16; B01L 2300/0663; B01L 2400/049; G01N 21/77; G01N 35/1004; B23B 7/06; B23Q 1/46; B23Q 15/013
    See application file for complete search history.

(56) References Cited

U.S. PATENT DOCUMENTS

| | | | |
|---|---|---|---|
| 2005/0279387 A1 | 12/2005 | Blackwell et al. | |
| 2009/0153855 A1* | 6/2009 | Bungo | G01J 3/0237 356/319 |
| 2015/0192601 A1 | 7/2015 | Cohen | |
| 2015/0346231 A1* | 12/2015 | Mori | G01N 35/1002 422/67 |
| 2018/0120340 A1 | 5/2018 | Yasui et al. | |

FOREIGN PATENT DOCUMENTS

| | | | |
|---|---|---|---|
| JP | 55-162063 A | | 12/1980 |
| JP | 62-242858 A | | 10/1987 |
| JP | 2002-340913 A | | 11/2002 |
| JP | 2004-325422 A | | 11/2004 |
| JP | 2005-257491 A | | 9/2005 |
| JP | 4443271 B2 | | 3/2010 |
| JP | 2011-95276 A | | 5/2011 |
| JP | 201581909 A | * | 4/2015 |
| WO | WO 2014/018754 A1 | | 1/2014 |

OTHER PUBLICATIONS

Kodama JP 2015-81909 A English translation (Year: 2015).*
Chinese-language Office Action issued in Chinese Application No. 201980059978.6 dated Oct. 7, 2023 with English translation (16 pages).
Extended European Search Report issued in European Application No. 19868306.2 dated Apr. 8, 2022 (seven (7) pages).
International Search Report (PCT/ISA/210) issued in PCT Application No. PCT/JP2019/037098 dated Nov. 26, 2019 with English translation (four (4) pages).
Japanese-language Written Opinion (PCT/ISA/237) issued in PCT Application No. PCT/JP2019/037098 dated Nov. 26, 2019 (five (5) pages).

* cited by examiner

[FIG. 1]
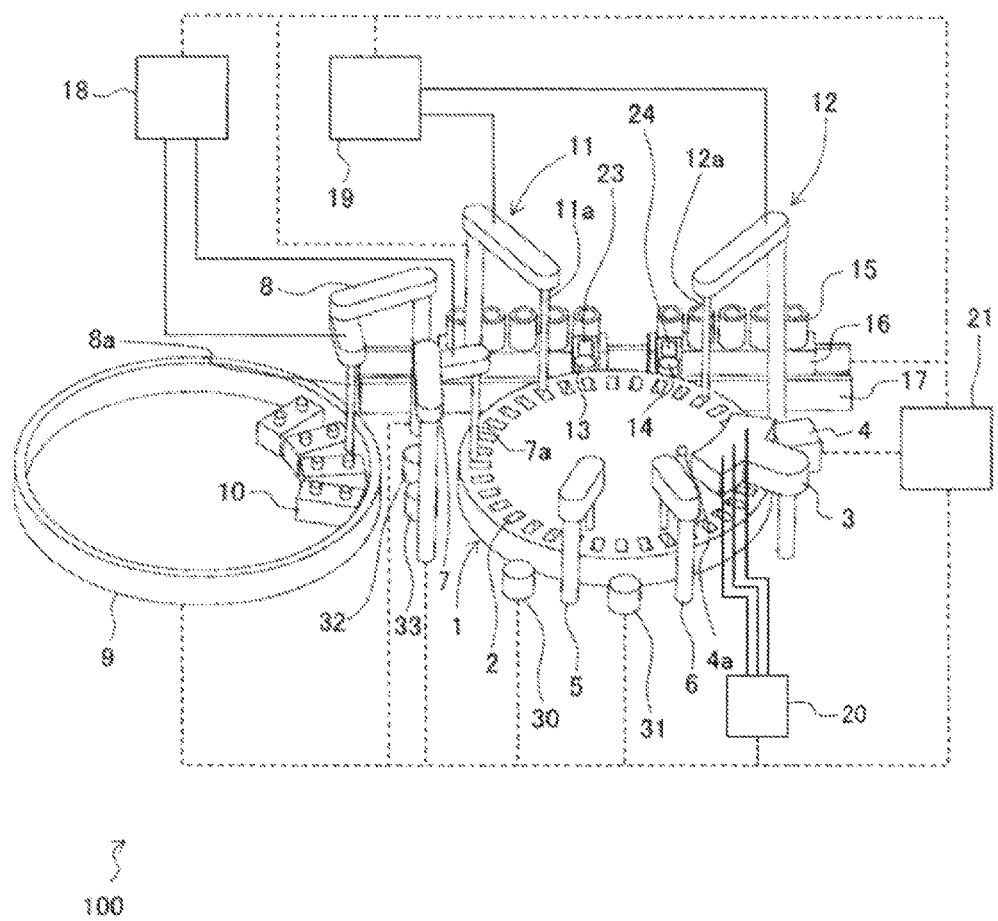

[FIG. 2]
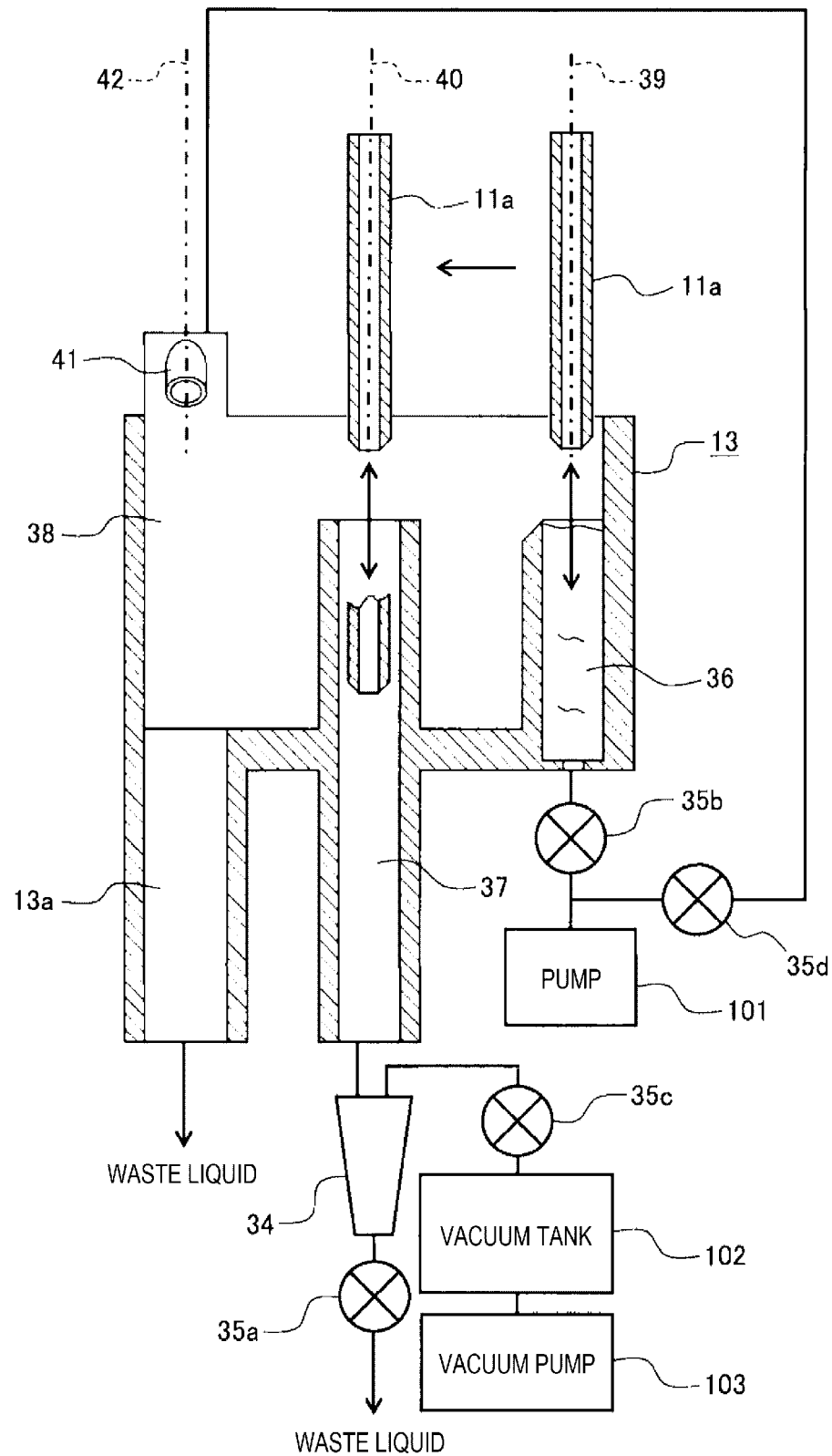

[FIG. 3]
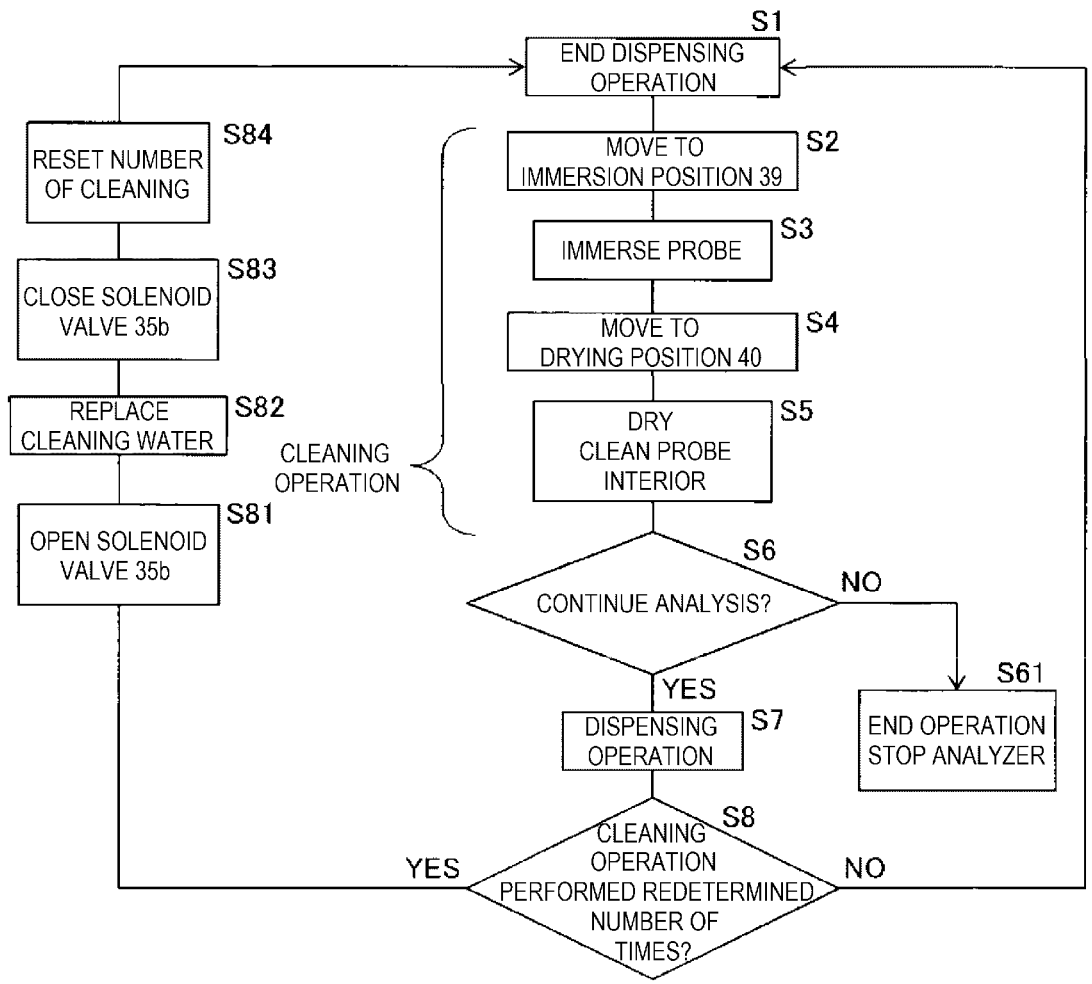
[FIG. 4]
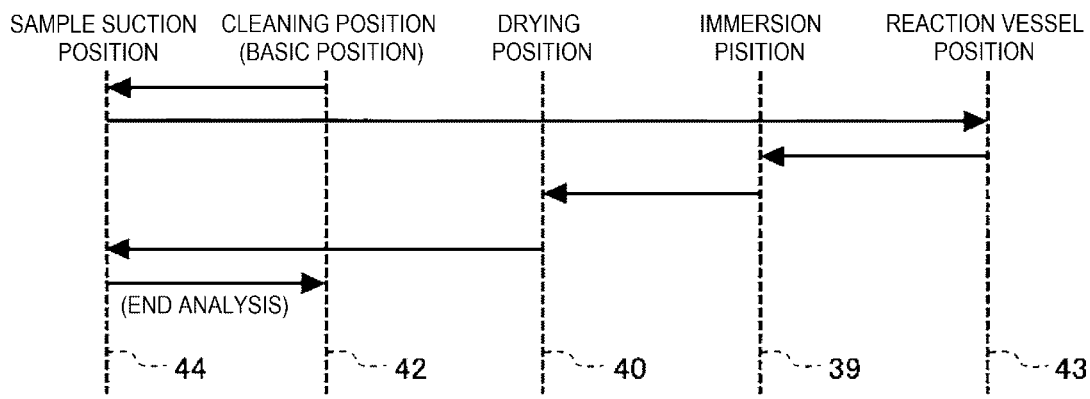

[FIG. 5]
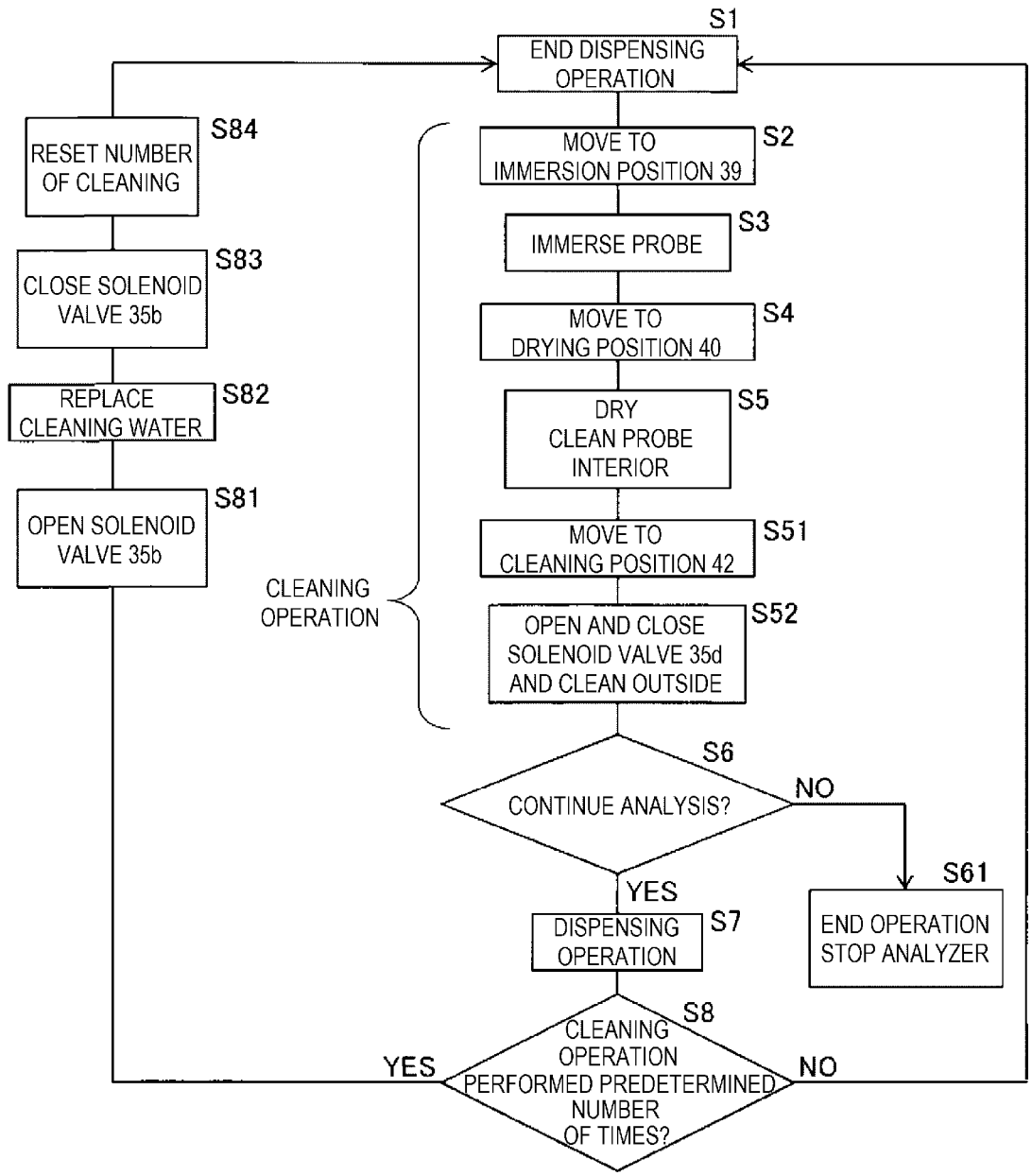

[FIG. 6]
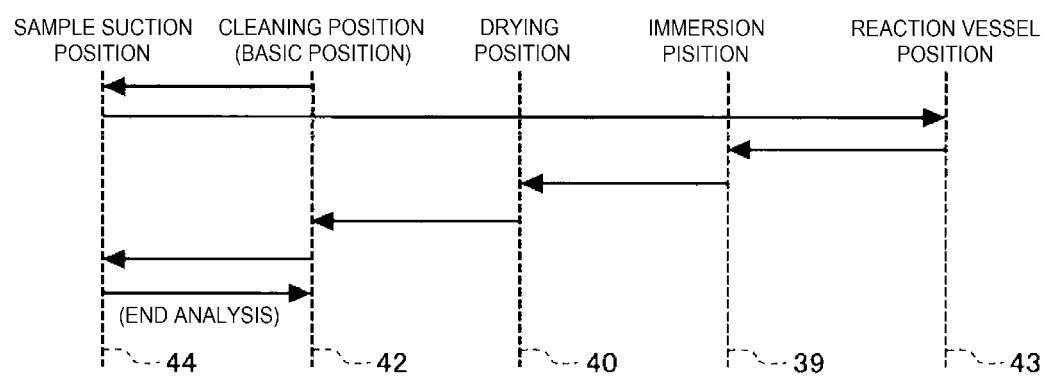

[FIG. 7]
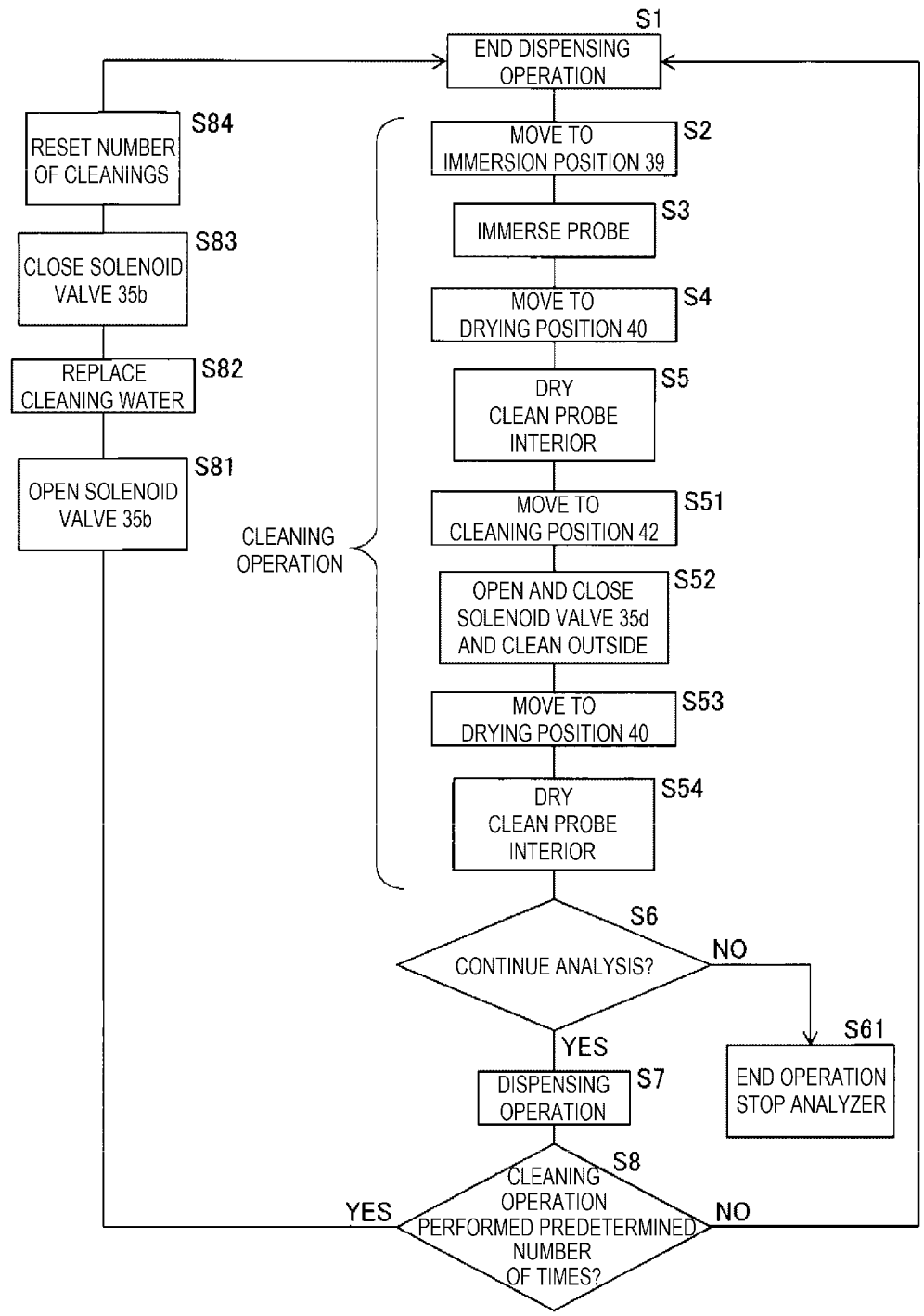

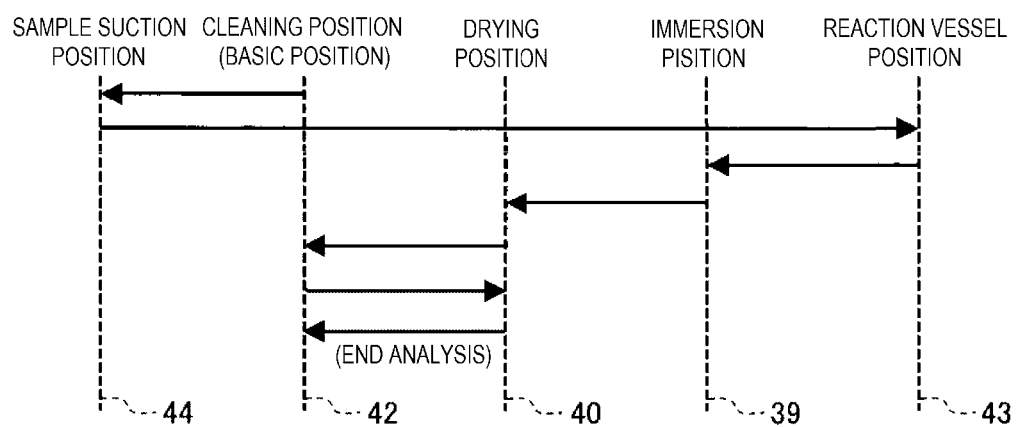
[FIG. 8]

AUTOMATED ANALYZER

TECHNICAL FIELD

The invention relates to an automated analyzer.

BACKGROUND ART

In an automated analyzer that performs qualitative and quantitative analysis of a sample, a certain amount of sample and a certain amount of reagent are discharged into a reaction vessel to be mixed and reacted, and a component, a concentration and the like of a specimen, which is the sample, are analyzed by optically measuring the reaction of this reaction solution. In such an automated analyzer, a probe used for dispensing the sample to be analyzed is appropriately cleaned to prevent the occurrence of cross-contamination and maintain analysis accuracy.

As a technique relating to cleaning such a probe, for example, Cited Literature 1 discloses an automated analyzer including a dispensing nozzle that dispenses a reagent and a specimen to be analyzed into a reaction vessel, and a cleaning unit that cleans the dispensing nozzle for repeated use. In the automated analyzer that measures the absorbance of a reaction solution chemically reacted in the reaction vessel and analyzes components, cleaning water remaining on an outer wall of the dispensing nozzle after the cleaning can be vacuum suctioned and removed in a non-contact manner, and the dispensing nozzle is dried.

CITATION LIST

Patent Literature

PTL 1: JP-A-2002-340913

SUMMARY OF INVENTION

Technical Problem

Cleaning the probe in the automated analyzer requires a large amount of water as cleaning water, and it is considered that analysis cannot be performed continuously in a case where a large amount of cleaning water cannot be ensured, for example, in a case where an automated analyzer is used in an area where a large amount of cleaning water cannot be ensured.

The invention has been made in view of the above, and an object of the invention is to provide an automated analyzer that can reduce the amount of cleaning water used in cleaning of a probe.

Solution to Problem

In order to achieve the above-described purpose, the invention provides an automated analyzer including: a probe configured to dispense an object to be dispensed to a plurality of reaction vessels for causing a sample to be analyzed to react with a reagent; a measurement unit configured to measure a reaction liquid of the sample and the reagent in the reaction vessel; a cleaning tank configured to clean the probe; and a control device configured to control an operation of the probe, the measurement portion, and the cleaning tank, in which the cleaning tank includes a cleaning pool configured to store cleaning water for immersing and cleaning the probe and clean the probe by inserting the probe from above, a supply valve configured to switch between flow and shutoff of cleaning water supplied from a pump to the cleaning pool, and a drying tank provided apart from a side of the cleaning pool and configured to suction cleaning water adhering to a surface of the probe in a tip end direction of the probe by inserting the probe from above, and the control device is configured to insert the probe into the cleaning pool and immerse and clean the probe in cleaning water in a state where the supply of cleaning water to the cleaning pool is shut off by the supply valve, pull the probe out of the cleaning pool after immersing and cleaning the probe in cleaning water, and move and insert the probe into the drying tank after pulling the probe out of the cleaning pool, and suction cleaning water on the surface of the probe.

Advantageous Effect

According to the invention, the amount of the cleaning water used in the cleaning of the probe can be reduced.

BRIEF DESCRIPTION OF DRAWINGS

FIG. 1 is a diagram schematically showing an overall configuration of an automated analyzer according to a first embodiment.

FIG. 2 is a vertical cross-sectional view showing a configuration of a cleaning tank.

FIG. 3 is a flowchart showing processing contents of cleaning processing according to the first embodiment.

FIG. 4 is a diagram showing a state of movement of a position of a sample probe according to the first embodiment.

FIG. 5 is a flowchart showing processing contents of cleaning processing according to a second embodiment.

FIG. 6 is a diagram showing a state of movement of a position of a sample probe according to the second embodiment.

FIG. 7 is a flowchart showing processing contents of cleaning processing according to a third embodiment.

FIG. 8 is a diagram showing a state of movement of a position of a sample probe according to the third embodiment.

DESCRIPTION OF EMBODIMENTS

Embodiments of the invention will be described with reference to the drawings.

First Embodiment

A first embodiment of the invention will be described with reference to FIGS. 1 to 4.

FIG. 1 is a diagram schematically showing an overall configuration of an automated analyzer according to the present embodiment.

In FIG. 1, an automated analyzer 100 is an apparatus that dispenses a sample and a reagent into reaction vessels 2 to cause a reaction and measures the reacted liquid, and schematically includes a sample transport mechanism 17, a reagent disk 9, a reaction disk 1, a first sample dispensing mechanism 11, a second sample dispensing mechanism 12, reagent dispensing mechanisms 7, 8, stirring mechanisms 5, 6, a light source 4a, a spectrophotometer 4, a cleaning mechanism 3, and a control device 21.

In the reaction disk 1, the reaction vessels 2 are arranged in a circumferential shape. The reaction vessel 2 is used for accommodating a mixed liquid obtained by mixing the sample and the reagent, and the plurality of reaction vessels 2 are disposed on the reaction disk 1. Near the reaction disk 1, the sample transport mechanism 17 that transports a sample rack 16 on which one or more sample vessels 15 accommodating the sample to be analyzed are mounted is disposed.

The first sample dispensing mechanism 11 and the second sample dispensing mechanism 12 that can rotate and move up and down are disposed between the reaction disk 1 and the sample transport mechanism 17.

The first sample dispensing mechanism 11 has a sample probe 11a disposed with a tip end thereof facing downward, and a sample pump 19 is connected to the sample probe 11a. The first sample dispensing mechanism 11 is configured to discharge, from the sample probe 11a, cleaning water (hereinafter, referred to as internal cleaning water) sent from a cleaning water tank (not shown) by the sample pump 19. In addition, the first sample dispensing mechanism 11 is configured to be able to rotate and move up and down in a horizontal direction, and the sample is dispensed from the sample vessel 15 to the reaction vessel 2 by inserting the sample probe 11a into the sample vessel 15 and operating the sample pump 19 to suction the sample, and inserting the sample probe 11a into the reaction vessel 2 to discharge the sample.

A cleaning tank 13 for cleaning the sample probe 11a by the cleaning water and a cleaning vessel 23 for cleaning the sample probe 11a by a special cleaning liquid are disposed within an operating range of the first sample dispensing mechanism 11. If a position where the sample probe 11a is inserted into the sample vessel 15 to suction the sample is a first sample suction position, and a position where the sample probe 11a is inserted into the reaction vessel 2 to discharge the sample is a first sample discharge position, the cleaning tank 13 and the cleaning vessel 23 are disposed between the first sample suction position and the first sample discharge position.

The second sample dispensing mechanism 12 has a sample probe 12a disposed with a tip end thereof facing downward, and a sample pump 19 is connected to the sample probe 12a. The second sample dispensing mechanism 12 is configured to discharge, from the sample probe 12a, cleaning water (internal cleaning water) sent from the cleaning water tank (not shown) by the sample pump 19. The second sample dispensing mechanism 12 is configured to be able to rotate and move up and down in the horizontal direction, and the sample is dispensed from the sample vessel 15 to the reaction vessel 2 by inserting the sample probe 12a into the sample vessel 15 and operating the sample pump 19 to suction the sample, and inserting the sample probe 12a into the reaction vessel 2 to discharge the sample.

A cleaning tank 14 for cleaning the sample probe 12a by the cleaning water and a cleaning vessel 24 for cleaning the sample probe 12a by a special cleaning liquid are disposed within an operating range of the second sample dispensing mechanism 12. If a position where the sample probe 12a is inserted into the sample vessel 15 to suction the sample is a second sample suction position, and a position where the sample probe 12a is inserted into the reaction vessel 2 to discharge the sample is a second sample discharge position, the cleaning tank 14 and the cleaning vessel 24 are disposed between the second sample suction position and the second sample discharge position.

The cleaning tanks 13, 14 clean the outside and inside of the sample probes 11a, 12a after the sample is dispensed every time the sample is dispensed. In addition, when there is a measurement request for analysis items registered in advance for the sample of a specimen type registered in advance, the cleaning vessels 23, 24 perform additional cleaning processing on the sample probes 11a, 12a before the sample is analyzed.

The reagent disk 9 is capable of placing a plurality of reagent bottles 10 accommodating the reagent used for analysis on a circumference, has a role as a storage of the reagent bottles 10, and has a function of keeping the reagent bottles 10 cool.

The reagent dispensing mechanisms 7, 8 for dispensing the reagent from the reagent bottles 10 to the reaction vessels 2, which are configured to be capable of rotationally moving in the horizontal direction and moving up and down are provided between the reaction disk 1 and the reagent disk 9, and include the reagent probes 7a, 8a with each tip end thereof facing downward. A reagent pump 18 is connected to the reagent probes 7a, 8a. With this reagent pump 18, the reagents, detergents, diluents, pretreatment reagents and the like suctioned from the reagent bottles 10 and the like via the reagent probes 7a, 8a are dispensed into the reaction vessels 2.

A cleaning tank 32 for cleaning the regent probe 7a by the cleaning water is disposed within the operating range of the reagent dispensing mechanism 7, and a cleaning tank 33 for cleaning the regent probe 8a by the cleaning water is disposed within the operating range of the reagent dispensing mechanism 8.

The stirring mechanisms 5, 6, the spectrophotometer 4 that measures absorbance of a reaction liquid by measuring transmitted light obtained from the light source 4a via the reaction liquid in the reaction vessel 2, the cleaning mechanism 3 that cleans the used reaction vessel 2 and the like are disposed around the reaction disk 1.

The stirring mechanisms 5, 6 are configured to be capable of rotating in the horizontal direction and moving up and down, and are inserted into the reaction vessel 2 to stir the mixed liquid (reaction liquid) of the sample and the reagent. The cleaning tanks 30, 31 for cleaning the stirring mechanisms 5, 6 by the cleaning water are disposed within operating ranges of the stirring mechanisms 5, 6. In addition, a detergent discharging mechanism 20 is connected to the cleaning mechanism 3.

The control device 21 is constituted by a computer and the like, controls an overall operation of the automated analyzer 100, and performs calculation processing of obtaining a concentration of a predetermined component in a liquid sample such as blood or urine. In FIG. 1, In order to simplify the illustration, a connection relation between each mechanism that constitutes the automated analyzer 100 and the control device 21 is partially omitted.

In the analysis processing of the sample to be analyzed by the automated analyzer 100 constituted as described above, first, the sample in the sample vessel 15 placed on the sample rack 16 transported to the vicinity of the reaction disk 1 by the sample transport mechanism 17 is dispensed into the reaction vessels 2 on the reaction disk 1 by the sample probe 11a of the first sample dispensing mechanism 11 or the sample probe 12a of the second sample dispensing mechanism 12. Next, the reagent used for the analysis is dispensed from the reagent bottle 10 on the reagent disk 9 to the reaction vessels 2 in which the sample is previously dispensed by the reagent probes 7a, 8a of the reagent dispensing mechanisms 7, 8. Next, the mixed liquid of the sample and the reagent in the reaction vessels 2 is stirred by the stirring mechanisms 5, 6. Then, light generated by the light source 4a is transmitted through the reaction vessel 2 containing the mixed liquid, and light intensity of the transmitted light is measured by the spectrophotometer 4. The light intensity measured by the spectrophotometer 4 is transmitted to the control device 21 via an A/D converter and an interface. Then, calculation is performed by the control device 21 to obtain the concentration of the predetermined component of the analysis items corresponding to the reagent, and the result is displayed on a display unit (not shown) and stored in a storage unit (not shown). The light source 4a, the spectrophotometer 4, and the control device 21 constitute a measurement unit that measures the reaction liquid of the sample and the reagent in the reaction vessel 2.

Here, in the following description, the cleaning tank 13 for the sample probe 11a will be described as a representative, but the structures and the cleaning processing of the cleaning tanks 14, 32, and 33 for the other sample probe 12a and the reagent probes 7a, 8a are the same as that of the sample probe 11a.

FIG. 2 is a vertical cross-sectional view showing a configuration of the cleaning tank.

In FIG. 2, the cleaning tank 13 for the sample probe 11a includes a cleaning pool 36 that stores cleaning water for immersing and cleaning the sample probe 11a, a drying tank 37 that suctions cleaning water adhering to the surface of the sample probe 11a, and an outer cleaning unit 38 that cleans the sample probe 11a by pouring cleaning water over the sample probe 11a.

In addition, the cleaning tank 13 is provided with a waste liquid port 13a that discharges the waste liquid (cleaning water) overflowing from the cleaning pool 36 and cleaning water discharged from a nozzle 41 of the outer cleaning unit 38 to an external waste liquid tank or a sewage system (both not shown).

The cleaning pool 36 immerses the sample probe 11a moved to an immersion position 39 in the stored cleaning water for cleaning. Into the cleaning pool 36, a pump 101 for supplying cleaning water supplies the cleaning water (for example, system water such as distilled water) from a position lower than a liquid level of the cleaning water stored in the cleaning pool 36 (for example, a bottom of the cleaning pool 36). Cleaning water is supplied from the pump 101 to the cleaning pool 36 by controlling opening and closing of a solenoid valve 35b provided in a flow path of the cleaning water between the pump 101 and the cleaning pool 36 to an open state by the control device 21. By supplying the cleaning water from the pump 101 to the cleaning pool 36 via the solenoid valve 35b, the cleaning water in the cleaning pool 36 is replaced, and the cleaning water overflowing from the cleaning pool 36 is discharged through the waste liquid port 13a. A cleaning effect can be improved by supplying the cleaning liquid in a state where the sample probe 11a is immersed in the cleaning pool 36.

The drying tank 37 inserts the sample probe 11a moved to a drying position 40 and removes the cleaning water on the surface by vacuum suction. At this time, the internal cleaning water (cleaning water) is also discharged from the sample probe 11a at the same time. A vacuum tank 102 for maintaining a negative pressure and a vacuum pump 103 for reducing the pressure in the vacuum tank 102 are connected to the drying tank 37 via a vacuum bottle 34. The vacuum bottle 34 traps the cleaning water removed by vacuum suction from the surface of the sample probe 11a inserted into the drying tank 37 and the internal cleaning water discharged from the sample probe 11a. When the vacuum pump 103 operates, the pressure inside the vacuum tank 102 connected to the vacuum pump 103 is reduced. The vacuum suction in the drying tank 37 is performed by controlling the opening and closing of a solenoid valve 35c provided between the vacuum tank 102 and the vacuum bottle 34 to an open state by the control device 21 (at this time, a solenoid valve 35a is controlled to a closed state). Furthermore, the waste liquid is discharged from the vacuum bottle 34 by controlling the opening and closing of the solenoid valve 35a provided in the flow path of the waste liquid from the vacuum bottle 34 to the open state by the control device 21 (at this time, the solenoid valve 35c is controlled to a closed state). By the vacuum suction of the drying tank 37, cleaning water on the surface of the sample probe 11a is removed together with dirt and the like.

The outer cleaning unit 38 cleans the surface of the sample probe 11a by pouring cleaning water over the sample probe 11a moved to a cleaning position 42. The outer cleaning unit 38 is provided with the nozzle 41 for discharging and pouring cleaning water on the surface of the sample probe 11a. Cleaning water is supplied to the nozzle 41 by controlling the opening and closing of the solenoid valve 35b provided in a flow path of the cleaning water between the pump 101 and the nozzle 41 to the open state by the control device 21.

Here, processing contents of the cleaning processing by the cleaning tanks 13, 14, 32, and 33 for the sample probes 11a, 12a and the reagent probes 7a, 8a will be described.

FIG. 3 is a flowchart showing the processing contents of the cleaning processing. In addition, FIG. 4 is a diagram showing a state of movement of a position of the sample probe.

In FIGS. 3 and 4, after the control device 21 moves the sample probe 11a from the sample vessel 15 to a sample suction position 44 where the specimen is suctioned to suction the sample, the control device 21 moves the sample probe 11a to a reaction vessel position 43 to discharge the specimen to the reaction vessel 2, and ends the dispensing processing (step S1).

Then, the control device 21 moves the sample probe 11a to the immersion position 39 (step S2), and immerses the sample probe 11a in the cleaning water stored in the cleaning pool 36 and pulls the sample probe 11a up (step S3). By immersing the sample probe 11a in the cleaning water of the cleaning pool 36 and pulling the sample probe 11a up, dirt adhering to the surface of the sample probe 11a is pulled and removed by a surface tension of the cleaning water, and the amount of dirt adhering to a side surface of the sample probe 11a is reduced.

Then, the control device 21 moves the sample probe 11a to the drying position 40 (step S4), inserts the sample probe 11a into the drying tank 37, removes the cleaning water on the surface by the vacuum suction, and, at the same time, discharges the system water from the sample probe 11a to clean the inside of the sample probe 11a (step S5).

Next, it is determined whether to continue the analysis operation (step S6), and if the determination result is NO, the control device 21 moves the sample probe 11a to the cleaning position 42 (basic position) and performs an end operation of the analysis processing to stop the automated analyzer 100 (step S61). Next, if the determination result in step S6 is YES, the control device 21 continues the dispensing operation (step S7), and determines whether the cleaning operation has been performed a predetermined number of times (step S8). The number of times the dispensing operation is performed is counted by the control device 21 and stored in the storage unit (not shown). If the determination result in step S8 is NO, the processing returns to step S1.

In addition, if the determination result in step S8 is YES, the control device 21 controls and opens the solenoid valve 35b into the open state (step S81), and replaces the cleaning water stored in the cleaning pool 36 (step S82), controls and closes the solenoid valve 35b into the closed state (step S83), resets the number of cleaning (step S84), and returns the processing to step S1.

When the cleaning operation (steps S2 to S5) is repeated, since the cleaning water stored in the cleaning pool 36 is contaminated gradually, cleaning water remaining in the cleaning pool 36 is replaced with fresh cleaning water when the cleaning operation is repeated a specified number of times. At this time, the amount of cleaning water used can be reduced by adjusting the number of times of replacement of the cleaning water stored in the cleaning pool 36 to be small.

Effects of the present embodiment configured as above will be described.

Cleaning the probe in the automated analyzer requires a large amount of water as the cleaning water, and it is considered that in a case where a large amount of cleaning water cannot be ensured, for example, in a case where the automated analyzer is used in an area where a large amount of cleaning water cannot be ensured, analysis cannot be performed continuously.

On the other hand, in the present embodiment, the automated analyzer 100 includes a probe (for example, the sample probes 11a, 12a, and the reagent probes 7a, 8a) for dispensing an object to be dispensed to the plurality of reaction vessels 2 for causing the sample to be analyzed to react with the reagent, the measurement unit (the second sample dispensing mechanism 12, the light source 4a, and the control device 21) for measuring the reaction liquid of the sample and the reagent in the reaction vessel 2, the cleaning tank for cleaning the probe, and the control device 21 for controlling the operation of the probe, the measurement unit, and the cleaning tanks 13, 14, 32, and 33. The cleaning tanks 13, 14, 32, and 33 include the cleaning pool 36 for storing the cleaning water for immersing and cleaning the probe and the drying tank 37 for suctioning the cleaning water adhering to the surface of the probe, and since the control device 21 is configured to cause the drying tank 37 to suction the cleaning water on the surface of the probe after the probe has been immersed in the cleaning water of the cleaning pool 36 and cleaned, it is possible to reduce the amount of cleaning water used in cleaning the sample probes 11a, 12a and the reagent probes 7a, 8a.

Second Embodiment

A second embodiment of the invention will be described with reference to FIGS. 5 and 6. In the present embodiment, only differences from the first embodiment will be described, similar members in the drawings as those of the first embodiment are denoted by the same reference numerals, and descriptions thereof are omitted.

In the present embodiment, in the cleaning operation, after vacuum suction performed by the drying tank 37, the sample probe is further moved to the cleaning position 42 to be cleaned by the outer cleaning unit 38.

FIG. 5 is a flowchart showing processing contents of cleaning processing. In addition, FIG. 6 is a diagram showing a state of movement of a position of the sample probe.

In FIGS. 5 and 6, after the control device 21 moves the sample probe 11a from the sample vessel 15 to the sample suction position 44 where the specimen is suctioned to suction the sample, the control device 21 moves the sample probe 11a to the reaction vessel position 43 to discharge the specimen to the reaction vessel 2, and ends the dispensing processing (step S1).

Then, the control device 21 moves the sample probe 11a to the immersion position 39 (step S2), and immerses the sample probe 11a in cleaning water stored in the cleaning pool 36 and pulls the sample probe 11a up (step S3).

Then, the control device 21 moves the sample probe 11a to the drying position 40 (step S4), inserts the sample probe 11a into the drying tank 37, removes the cleaning water on the surface by the vacuum suction, and, at the same time, discharges system water from the sample probe 11a to clean the inside of the sample probe 11a (step S5).

Then, the control device 21 moves the sample probe 11a to the cleaning position 42 (step S51), and controls the opening and closing of a solenoid valve 35d to discharge the cleaning water from the nozzle 41 to the sample probe 11a in the outer cleaning unit 38 to perform external cleaning (step S52). At this time, since the cleaning water on the surface of the sample probe 11a is removed together with dirt by the vacuum suction before the external cleaning, the amount of cleaning water used for the external cleaning can be reduced while maintaining effects of the cleaning operation.

Next, it is determined whether to continue the analysis operation (step S6), and if the determination result is NO, the control device 21 moves the sample probe 11a to the cleaning position 42 (basic position) and performs the end operation of the analysis processing to stop the automated analyzer 100 (step S61). Next, if the determination result in step S6 is YES, the control device 21 continues the dispensing operation (step S7), and it is determined whether the cleaning operation has been performed a predetermined number of times (step S8). The number of times the dispensing operation is performed is counted by the control device 21 and stored in the storage unit (not shown). If the determination result in step S8 is NO, the processing returns to step S1.

In addition, if the determination result in step S8 is YES, the control device 21 controls and opens the solenoid valve 35b into the open state (step S81), and replaces cleaning water stored in the cleaning pool 36 (step S82), control and closes the solenoid valve 35b into the closed state (step S83), resets the number of cleaning (step S84), and returns the processing to step S1.

When the cleaning operation (steps S2 to S52) is repeated, since the cleaning water stored in the cleaning pool 36 is contaminated gradually, cleaning water remaining in the cleaning pool 36 is replaced with fresh cleaning water when the cleaning operation is repeated a specified number of times. At this time, the amount of cleaning water used can be reduced by adjusting the number of times of replacement of the cleaning water stored in the cleaning pool 36 to be small.

Other configurations are similar to those in the first embodiment.

The present embodiment configured as above can exert similar effects as those of the first embodiment.

In addition, since the cleaning water on the surface of the sample probe 11a is removed together with the dirt by the vacuum suction before the external cleaning, the amount of cleaning water used for the external cleaning can be reduced while maintaining the effects of the cleaning operation.

Third Embodiment

A third embodiment of the invention will be described with reference to FIGS. 7 and 8. In the present embodiment, only differences from the first and second embodiments will be described, similar members in the drawings as those of the first embodiment are denoted by the same reference numerals, and descriptions thereof are omitted.

In the present embodiment, in the cleaning operation, after vacuum suction performed by the drying tank 37, the sample probe is moved to the cleaning position 42 to be cleaned by the outer cleaning unit 38, and then the vacuum suction performed by the drying tank 37 is further performed.

FIG. 7 is a flowchart showing processing contents of cleaning processing. In addition, FIG. 8 is a diagram showing a state of movement of a position of the sample probe.

In FIGS. 7 and 8, after the control device 21 moves the sample probe 11a from the sample vessel 15 to the sample suction position 44 where the specimen is suctioned to suction the sample, the control device 21 moves the sample probe 11a to the reaction vessel position 43 to discharge the specimen to the reaction vessel 2, and ends the dispensing processing (step S1).

Then, the control device 21 moves the sample probe 11a to the immersion position 39 (step S2), and immerses the sample probe 11a in the cleaning water stored in the cleaning pool 36 and pulls the sample probe 11a up (step S3).

Then, the control device 21 moves the sample probe 11a to the drying position 40 (step S4), inserts the sample probe 11a into the drying tank 37, removes the cleaning water on the surface by the vacuum suction, and, at the same time, discharges the system water from the sample probe 11a to clean the inside of the sample probe 11a (step S5).

Then, the control device 21 moves the sample probe 11a to the cleaning position 42 (step S51), and controls the opening and closing of the solenoid valve 35d to discharge the cleaning water from the nozzle 41 to the sample probe 11a in the outer cleaning unit 38 to perform external cleaning (step S52).

Then, the control device 21 moves the sample probe 11a to the drying position 40 (step S53), inserts the sample probe 11a into the drying tank 37, removes the cleaning water on the surface by the vacuum suction, and, at the same time, discharges the system water from the sample probe 11a to clean the inside of the sample probe 11a (step S54). At this time, since dirt is removed by the vacuum suction before the external cleaning and the vacuum suction after the external cleaning is performed, the amount of cleaning water used can be further reduced while maintaining the effects of the cleaning operation.

Next, it is determined whether to continue the analysis operation (step S6), and if the determination result is NO, the control device 21 performs the end operation of the analysis processing to stop the automated analyzer 100 (step S61). Next, if the determination result in step S6 is YES, the control device 21 continues the dispensing operation (step S7), and determines whether the cleaning operation has been performed a predetermined number of times (step S8). The number of times the dispensing operation is performed is counted by the control device 21 and stored in the storage unit (not shown). If the determination result in step S8 is NO, the processing returns to step S1.

In addition, if the determination result in step S8 is YES, the control device 21 controls and opens the solenoid valve 35b into the open state (step S81), and replaces the cleaning water stored in the cleaning pool 36 (step S82), controls and closes the solenoid valve 35b into the closed state (step S83), resets the number of cleaning (step S84), and returns the processing to step S1.

When the cleaning operation (steps S2 to S54) is repeated, since the cleaning water stored in the cleaning pool 36 is contaminated gradually, cleaning water remaining in the cleaning pool 36 is replaced with fresh cleaning water when the cleaning operation is repeated a specified number of times. At this time, the amount of cleaning water used can be reduced by adjusting the number of times of replacement of cleaning water stored in the cleaning pool 36 to be small.

Other configurations are similar to those in the first and second embodiments.

The present embodiment configured as above can exert similar effects as those of the first embodiment.

In addition, since dirt is removed by the vacuum suction before the external cleaning and the vacuum suction after the external cleaning is performed, the amount of cleaning water used can be further reduced while maintaining the effects of the cleaning operation.

APPENDIX

The invention is not limited to the above-described embodiments, and includes various modifications and combinations without departing from the scope thereof. In addition, the invention is not limited to those including all the configurations described in the above-described embodiments, and includes those in which a part of the configuration is deleted.

For example, it is also effective to add a detergent, such as a surface active agent, into the cleaning pool 36 to improve an immersing effect in the cleaning pool 36.

In addition, dirt may be peeled off more easily by forming a flow of the cleaning water in the cleaning pool 36. This effect can be realized by, for example, when the probe is immersed, forming a whirlpool of the cleaning water by discharging internal cleaning water in the cleaning pool to cause turbulence in the cleaning pool 36, or providing a propeller (not shown) in the cleaning pool 36.

Further, a cleaning layer includes two or more cleaning pools, and by immersing the probe in the first cleaning pool, and, in the second cleaning pool, forming a flow of the cleaning water in the cleaning pool to make the dirt to be peeled off more easily, the amount of outer cleaning water used for the probe can be reduced. By setting a discharge position of the internal cleaning water to the drying tank 37, even if the vacuum suctioned dirt adheres to the flow path between the drying tank 37 and the vacuum bottle 34, the dirt can be cleaned and washed away, and clogging of the flow path can be prevented.

In addition, even if the specimen attached to the side surface of the probe is directly vacuum suctioned at the drying position 40 after the object to be dispensed is discharged into the reaction vessel 2, since the specimen adhering to the side surface of the probe can be reduced by the vacuum suction operation, subsequent cleaning time at the cleaning position 42 can be reduced, and as a result, the amount of cleaning water can be reduced.

In addition, instead of a vacuum suction method, the drying tank 37 may use a method of blowing airflow from a direction perpendicular to the sample probe 11a to blow off droplets and dirt.

In addition, each of the above-described configurations, functions, and the like may be partially or entirely implemented by design using, for example, an integrated circuit. In addition, each of the above-mentioned configurations, functions, and the like may be implemented by software by means of a processor interpreting and executing a program for implementing respective functions.

REFERENCE SIGN LIST 1 reaction disk
2 reaction vessel 3 cleaning mechanism
4 spectrophotometer
4a light source
5 stirring mechanism
6 stirring mechanism
7 reagent dispensing mechanism
7a reagent probe
8 reagent dispensing mechanism
8a reagent probe
9 reagent disk
10 reagent bottle
11 first sample dispensing mechanism
11a sample probe
12 second sample dispensing mechanism
12a sample probe
13, 14 cleaning tank
13a waste liquid port
15 sample vessel
16 sample rack
17 sample transport mechanism
18 reagent pump
19 sample pump
20 detergent discharging mechanism
21 control device
23 cleaning vessel
24 cleaning vessel
30, 31 cleaning tank
32, 33 cleaning tank
34 vacuum bottle
35a solenoid valve
35b solenoid valve
35c solenoid valve
35d solenoid valve
36 cleaning pool
37 drying tank
38 outer cleaning unit
39 immersion position
40 drying position
41 nozzle
42 cleaning position
43 reaction vessel position
44 sample suction position
100 automated analyzer
101 pump
102 vacuum tank
103 vacuum pump

The invention claimed is:

1. An automated analyzer comprising:
a probe configured to dispense an object into a plurality of reaction vessels for reacting a sample with a reagent;
a measurement unit configured to measure a reaction liquid mixture of the sample and the reagent in the reaction vessel;
a cleaning tank configured to clean the probe; and
a control device configured to control an operation of the probe, an operation of the measurement unit, and an operation of the cleaning tank, wherein the cleaning tank includes:
a cleaning pool configured to store an amount of cleaning water for immersing and cleaning the probe by inserting the probe from above;
a supply valve configured to supply cleaning water from a pump to the cleaning pool by switching between a shut off state where a first supply of cleaning water to the cleaning pool is shut off by the supply valve to a flow state where the first supply of cleaning water is supplied to the cleaning pool by the supply valve;
a drying tank provided apart from a side of the cleaning pool and configured to suction cleaning water adhering to a surface of the probe in a tip end direction of the probe by inserting the probe from above; and wherein
the control device is configured to
insert the probe into the cleaning pool, to immerse the probe and to clean the probe in the first supply of cleaning water in the shut off state,
to pull the probe out of the cleaning pool after immersing and cleaning the probe in the first supply of cleaning water, and
to move the probe and to insert the probe into the drying tank after pulling the probe out of the cleaning pool, and to suction cleaning water on the surface of the probe,
wherein the cleaning tank includes an outer cleaning unit configured to clean an outer surface of the probe by pouring a second supply of cleaning water on the probe after the cleaning water on the surface of the probe is suctioned by the drying tank.

2. The automated analyzer according to claim 1, wherein the control device is configured to control the drying tank such that the drying tank suctions cleaning water on the surface of the probe, and discharges cleaning water from the probe.

3. The automated analyzer according to claim 1, wherein the control device is configured to control the drying tank such that the drying tank suctions cleaning water on the surface of the probe after the outer cleaning unit cleans the probe.

4. An automated analyzer comprising:
a probe configured to dispense an object into a plurality of reaction vessels for reacting a sample with a reagent;
a measurement unit configured to measure a reaction liquid mixture of the sample and the reagent in the reaction vessel;
a cleaning tank configured to clean the probe; and
a control device configured to control an operation of the probe, an operation of the measurement unit, and an operation of the cleaning tank, wherein the cleaning tank includes:
a cleaning pool configured to store an amount of cleaning water for immersing and cleaning the probe by inserting the probe from above;
a supply valve configured to supply cleaning water from a pump to the cleaning pool by switching between a shut off state where a first supply of cleaning water to the cleaning pool is shut off by the supply valve to a flow state where the first supply of cleaning water is supplied to the cleaning pool by the supply valve;
a drying tank provided apart from a side of the cleaning pool and configured to suction cleaning water adhering to a surface of the probe in a tip end direction of the probe by inserting the probe from above; and wherein
the control device is configured to
insert the probe into the cleaning pool, to immerse the probe and to clean the probe in the first supply of cleaning water in the shut off state,
to pull the probe out of the cleaning pool after immersing and cleaning the probe in the first supply of cleaning water, and to move the probe and to insert the probe into the drying tank after pulling the probe out of the cleaning pool, and to suction cleaning water on the surface of the probe, wherein in the cleaning pool of the cleaning tank, a pump for supplying cleaning water is configured to supply cleaning water from a position lower than a liquid level of cleaning water stored in the cleaning pool.

5. An automated analyzer comprising:

a probe configured to dispense an object into a plurality of reaction vessels for reacting a sample with a reagent;

a measurement unit configured to measure a reaction liquid mixture of the sample and the reagent in the reaction vessel;

a cleaning tank configured to clean the probe; and a control device configured to control an operation of the probe, an operation of the measurement unit, and an operation of the cleaning tank, wherein the cleaning tank includes:

a cleaning pool configured to store an amount of cleaning water for immersing and cleaning the probe by inserting the probe from above;

a supply valve configured to supply cleaning water from a pump to the cleaning pool by switching between a shut off state where a first supply of cleaning water to the cleaning pool is shut off by the supply valve to a flow state where the first supply of cleaning water is supplied to the cleaning pool by the supply valve;

a drying tank provided apart from a side of the cleaning pool and configured to suction cleaning water adhering to a surface of the probe in a tip end direction of the probe by inserting the probe from above; and wherein the control device is configured to insert the probe into the cleaning pool, to immerse the probe and to clean the probe in the first supply of cleaning water in the shutoff state, to pull the probe out of the cleaning pool after immersing and cleaning the probe in the first supply of cleaning water, and to move the probe and to insert the probe into the drying tank after pulling the probe out of the cleaning pool, and to suction cleaning water on the surface of the probe, wherein the control device is further configured to supply cleaning water to the cleaning pool in a state where the probe is immersed in previously supplied cleaning water of the cleaning pool.

6. The automated analyzer according to claim 1, wherein the cleaning tank includes a plurality of cleaning pools.

7. The automated analyzer according to claim 1, wherein the cleaning tank is disposed between the cleaning pool and the outer cleaning unit.

8. An automated analyzer comprising:

a probe configured to dispense an object into a plurality of reaction vessels for reacting a sample with a reagent;

a measurement unit configured to measure a reaction liquid mixture of the sample and the reagent in the reaction vessel;

a cleaning tank configured to clean the probe; and a control device configured to control an operation of the probe, an operation of the measurement unit, and an operation of the cleaning tank, wherein the cleaning tank includes:

a cleaning pool configured to store an amount of cleaning water for immersing and cleaning the probe by inserting the probe from above;

a supply valve configured to supply cleaning water from a pump to the cleaning pool by switching between a shut off state where a first supply of cleaning water to the cleaning pool is shut off by the supply valve to a flow state where the first supply of cleaning water is supplied to the cleaning pool by the supply valve;

a drying tank provided apart from a side of the cleaning pool and configured to suction cleaning water adhering to a surface of the probe in a tip end direction of the probe by inserting the probe from above; and wherein the control device is configured to insert the probe into the cleaning pool, to immerse the probe and to clean the probe in the first supply of cleaning water in the shut off state, to pull the probe out of the cleaning pool after immersing and cleaning the probe in the first supply of cleaning water, and to move the probe and to insert the probe into the drying tank after pulling the probe out of the cleaning pool, and to suction cleaning water on the surface of the probe, wherein the control device is further configured to replace the first supply of cleaning water stored in the cleaning pool with a second supply of cleaning water after the probe in the cleaning water of the cleaning pool is cleaned by being immersed one or more predetermined number of times.

\* \* \* \* \*